US011671188B2

(12) United States Patent
Meylan et al.

(10) Patent No.: US 11,671,188 B2
(45) Date of Patent: Jun. 6, 2023

(54) USER-INVOLVED ANTENNA MANAGEMENT

(71) Applicant: QUALCOMM Incorporated, San Diego, CA (US)

(72) Inventors: Arnaud Meylan, San Diego, CA (US); Leena Zacharias, San Jose, CA (US); Michel Evan Chauvin, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 17/077,938

(22) Filed: Oct. 22, 2020

(65) Prior Publication Data

US 2021/0159990 A1    May 27, 2021

Related U.S. Application Data

(60) Provisional application No. 62/925,558, filed on Oct. 24, 2019.

(51) Int. Cl.
*H04B 17/309*  (2015.01)
*G08B 7/06*  (2006.01)
*H04W 88/02*  (2009.01)

(52) U.S. Cl.
CPC ............ *H04B 17/309* (2015.01); *G08B 7/06* (2013.01); *H04W 88/02* (2013.01)

(58) Field of Classification Search
CPC .... H04B 17/309; H04B 17/12; H04B 1/3838; H04B 17/318; G08B 7/06; H04W 88/02; H04L 1/1854
See application file for complete search history.

(56) References Cited

U.S. PATENT DOCUMENTS

| | | | |
|---|---|---|---|
| 2008/0132283 A1 | 6/2008 | Ponce De Leon et al. | |
| 2009/0096683 A1* | 4/2009 | Rosenblatt | H01Q 1/242 343/702 |
| 2013/0064151 A1* | 3/2013 | Mujtaba | H04L 43/0823 370/311 |
| 2014/0357313 A1* | 12/2014 | Mercer | H04W 88/06 455/552.1 |
| 2015/0179043 A1 | 6/2015 | Gude et al. | |

(Continued)

OTHER PUBLICATIONS

International Search Report and Written Opinion—PCT/US2020/057035—ISA/EPO—dated Feb. 11, 2021.

*Primary Examiner* — Lester G Kincaid
*Assistant Examiner* — Maryam Soltanzadeh
(74) *Attorney, Agent, or Firm* — Holland & Hart LLP

(57) ABSTRACT

Methods, systems, and devices for wireless communications are described. In some wireless communications networks, a device, such as a user equipment (UE), may be configured to detect a signal blockage affecting one or more antennas of the UE. The signal blockage may be associated with the position of a body, such as a user, relative to the one or more antennas of the UE, which may include how a user places their hand on or near the device during use. The position of the body may block one or more of the antennas of the UE, causing increased signal attenuation and decreased communications performance. The UE may be configured to signal, an indication based on detecting the signal blockage.

40 Claims, 12 Drawing Sheets

(56) References Cited

U.S. PATENT DOCUMENTS

| | | | |
|---|---|---|---|
| 2015/0280884 A1* | 10/2015 | Choi | H04L 25/03974 |
| | | | 370/329 |
| 2017/0005707 A1* | 1/2017 | Islam | H01Q 3/24 |
| 2019/0124645 A1* | 4/2019 | Huang | H04W 76/27 |
| 2019/0288755 A1* | 9/2019 | Li | H04B 7/0814 |
| 2020/0328797 A1* | 10/2020 | Gajula | H04B 7/086 |
| 2021/0044927 A1* | 2/2021 | Jia | H04W 88/00 |

* cited by examiner

USER-INVOLVED ANTENNA MANAGEMENT

CROSS REFERENCE

The present Application for Patent claims the benefit of U.S. Provisional Patent Application No. 62/925,558 by Meylan et al., entitled "USER-INVOLVED ANTENNA MANAGEMENT," filed Oct. 24, 2019, assigned to the assignee hereof, and expressly incorporated by reference herein.

BACKGROUND

The following relates generally to wireless communications, and more specifically to user-involved antenna management.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Communication devices in a wireless network may be subject to various regulatory requirements intended to avoid potential safety hazards of human exposure to radio-frequency (RF) energy. As an example, such regulatory requirements may impose some restrictions on transmitting devices, for example, through limiting a transmit power of the device. However, such regulatory requirements, in addition to other factors, may affect both uplink and downlink communications performance by the device, which may further impact a user's experience.

SUMMARY

The described techniques relate to improved methods, systems, devices, and apparatuses that support user-involved antenna management. In some examples, devices in a wireless network may communicate using beamformed transmissions, where a transmitting device, such as a base station, may transmit messages using a number of beams to a receiving device, such as a user equipment (UE). The UE may monitor the beams using one or more antennas. In some aspects, the base station and the UE may coordinate communications such that a beam having high transmit power on the downlink sent by the base station may be received by one or more of the antennas at the UE. In some cases, however, communications between the base station and the UE may experience decreased communication quality and increased signal attenuation as a result of various factors, such as diffraction, absorption, or blockage of signaling, in addition to other aspects that may increase path-loss or other types of interference. Further reduction in signal strength may occur when one or multiple antennas located at the UE are blocked, for example, due to interference introduced by the user of the device.

In some cases, a UE may be configured with a detector to detect a signal blockage affecting one or more antennas of the UE, where the signal blockage may be associated with a position of the user's body tissue, or some other tissue (e.g., a non-user's body or tissue, an animal's body or tissue) relative to the one or more antennas. For example, the user may orient their hand(s), finger(s), wrist, or arm in such a way that blocks or covers one of the antennas of the UE and degrades the wireless link quality. In response, the UE may signal an indication of such blockage to the user. In some cases, the indication of blockage may include an indication or notification to the user associated with the signal blockage that the UE detects. In some examples, the indication to the user may include audio feedback, haptic feedback, a change in temperature, visual feedback, or other types of indications that signal the blockage caused by the position of the user (e.g., human tissue interfering with energy in the RF spectrum).

A method of wireless communication at a UE is described. The method may include detecting a signal blockage affecting one or more antennas of the UE, the signal blockage associated with a position of a body relative to the one or more antennas and signaling an indication associated with the detected signal blockage based on the detected signal blockage.

An apparatus for wireless communication at a UE is described. The apparatus may include a processor, memory coupled with the processor, and instructions stored in the memory. The instructions may be executable by the processor to cause the apparatus to detect a signal blockage affecting one or more antennas of the UE, the signal blockage associated with a position of a body relative to the one or more antennas and signal an indication associated with the detected signal blockage based on the detected signal blockage.

Another apparatus for wireless communication at a UE is described. The apparatus may include means for detecting a signal blockage affecting one or more antennas of the UE, the signal blockage associated with a position of a body relative to the one or more antennas and signaling an indication associated with the detected signal blockage based on the detected signal blockage.

A non-transitory computer-readable medium storing code for wireless communication at a UE is described. The code may include instructions executable by a processor to detect a signal blockage affecting one or more antennas of the UE, the signal blockage associated with a position of a body relative to the one or more antennas and signal an indication associated with the detected signal blockage based on the detected signal blockage.

DETAILED DESCRIPTION

Figure 1:
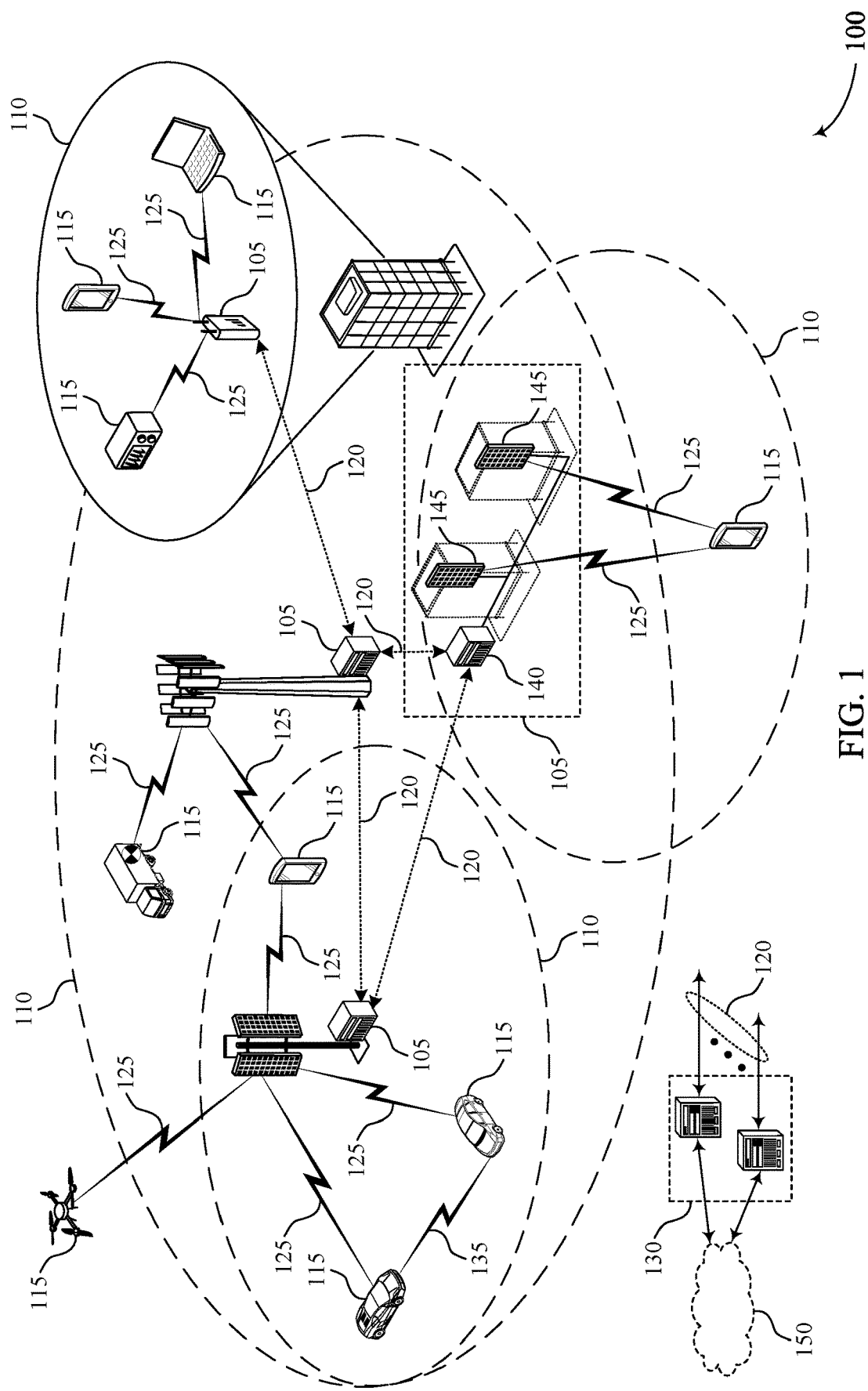
FIG. 1 illustrates an example of a wireless communications system that supports user-involved antenna management in accordance with aspects of the present disclosure.

Some wireless communication devices in a wireless network may be subject to various regulatory requirements that are put into place to limit potential safety hazards of human exposure to radio-frequency (RF) energy emitted by a device. One such regulation is related to maximum permissible exposure (MPE) levels for transmitting devices as developed by the Federal Communications Commission (FCC) in the United States, which is based in part on a number of metrics. One such metric includes the power density (PD) of emissions, or the amount of power incident in a given area (e.g., a square) at the surface of the body or tissue, which may be used in some wireless communications systems (e.g., millimeter wave (mmW) systems), such as those operating above a given frequency (e.g., above 6 GHz). Another metric may include a specific absorption rate (SAR) of RF energy in human tissue, or the measure of power absorbed into a given volume, which may be used in some wireless communications systems operating at relatively lower frequencies.

In some wireless communications systems (e.g., mmW systems) the FCC may use PD to determine certain MPE limits above certain frequencies (e.g., above 6 GHz). Certain transmissions above certain frequencies within the wireless communications system may not significantly penetrate tissue, but may heat up the surface of the tissue. For example, in the example of a mmW system, wireless transmissions may be easily blocked by tissue, resulting in increased MPE considerations for transmissions.

Other countries or locations may have similar regulations and requirements placed on wireless devices. Such regulatory requirements may impose limits on the signaling strength of various transmissions in the network, which may impact the transmit power for beamformed communications transmitted by a device such as a user equipment (UE) or a base station. However, the reduction in transmit strength may affect both uplink and downlink communications performance.

A base station and a UE communicating in a wireless network may perform a number of beam management procedures to monitor beam performance and identify candidate beams that provide various qualities of service and performance. In some aspects, a transmitting device such as a base station may transmit beamformed signals within a coverage area, and a receiving device such as a UE may monitor the beamformed signals using one or more antennas located at the UE. In some cases, communications between the base station and the UE may be associated with increased signal attenuation influenced by various factors such as compliance to certain MPE guidelines. Other factors may include diffraction, absorption, blockage, and other aspects that may induce path-loss or other kinds of signal interference.

Further reduction in signal strength may occur when one or multiple antennas located at the receiving device are blocked due to interference introduced by the user of the device. In one example, a user may block one or multiple antennas while holding the device in a certain way, or a user may cover or block an antenna in the transmitting device when placing their hand or finger in some area of the device. In such examples, it may be desirable to firstly inform the user of potential antenna blockage. In addition, employing techniques that provide an indication as to how the user may be able to reorient their finger or hand may avoid or reduce blockage and improve the link quality.

As described herein, a wireless device may include a sensor or detector (e.g., such as a near-field MPE sensor or similar component) that may sense the presence of human skin/tissue at or near the UE. The MPE sensor may be coupled with various other components of the device (e.g., such as an antenna or a device modem), and may inform other device components which receive beams, and whether the receive beams are intercepted by body tissue (e.g., human tissue). The sensor may provide feedback to various other components of the device (e.g., feedback may be sent to a device modem, processor, or the like) as to which antennas are blocked, and the device may inform the user which antennas are impacted by blockage or attenuation by providing the user with an indication. In some aspects, the device may inform the user how they could potentially move their body to improve the link quality by removing the detected blockage. The device may inform the user using a number of different feedback mechanisms such as visual (e.g., on screen) indications, haptic feedback, light (e.g., a light-emitting diode (LED) on the case), heat, changes to sound or other device functionality, or the like.

Various factors may be considered to determine when the device may notify the user of blockage, including the input from the MPE sensor for each antenna, a percentage of time different antennas are used, a link budget dropping below a threshold, the frequency of backing off transmit power (e.g., to comply with MPE requirements), or the type of communications at the device (e.g., low latency, high reliability, etc.). By signaling the user to reposition their grip on the device or otherwise reorient their body, the device's antennas may become free of obstruction, and improved link quality as well as higher transmit power availability may be achieved.

A number of different inputs or triggers may be used to identify cases where the device may notify the user of one or multiple blocked antennas. In one case, a device or a device modem informing the user of one or multiple blocked antennas based on an amount that a given antenna is in use, and/or by comparing the amount of time that one antenna is used relative to an amount of time a different antenna is used. For example, a device may determine a percentage of absolute time that each antenna is in use (e.g., for transmission or reception), or may determine a percentage of relative time that each antenna is in use compared to other antennas. The device may compare this percentage to a certain threshold percentage. In cases where the determined percentage of absolute time that the antenna is in use exceeds the threshold percentage, and the antenna is determined to be blocked by human tissue, then the device may inform the user of the blockage.

In another case, a device may determine that the link budget is poor, or is below a threshold link budget, and in addition the device may detect the user blocking one or more of the multiple antennas. As a result, the device may determine to not notify the user of the blocked antenna. In another case, a device or a device component (e.g., an MPE sensor) may determine that human tissue is within a threshold proximity, and the device may indicate such a determination to the user. In yet another case, a device may be indicated for high-priority, low latency, and/or high reliability (e.g., ultra-reliable low-latency communications (URLLC), communications with low block error ratio (BLER) target, or the like). In such cases, if an MPE sensor detects signal blockage due to human tissue, the device may report such blockage to the user to help decrease the latency and increase signal strength for communications at the device. In addition, the frequency of indications that the device may provide to the user may increase based on the types of communications the device is configured for.

A number of other factors may be considered by a device that determines to notify the user of one or multiple blocked antennas, and the device may dynamically adapt to changes in a user's hand position at the device. As such, the device may aid the user in achieving increased communications performance for their device.

Particular aspects of the subject matter described herein may be implemented to realize one or more advantages. The described techniques may support improvements in uplink and/or downlink communications between a UE and a base station by decreasing latency and improving reliability, among other advantages due to implementing techniques that allow a device to signal, to a user of the device, an antenna blockage being caused by a user of the device. As such, supported techniques may include improved network operations and, in some examples, may promote network efficiencies, among other benefits.

Aspects of the disclosure are initially described in the context of a wireless communications system. Further examples are then provided that illustrate the indication of one or more antennas blocked by human tissue. Aspects of the disclosure are further illustrated by and described with reference to apparatus diagrams, system diagrams, and flowcharts that relate to user-involved antenna management.

FIG. 1 illustrates an example of a wireless communications system 100 that supports user-involved antenna management in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR, NR in unlicensed spectrum). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the RF spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a RF spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support URLLC or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed RF spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or RF beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may support beamformed transmissions between base stations 105 and UEs 115. A base station 105 may transmit beamformed signals within a coverage area 110, and a UE 115 may monitor for signaling using one or more antennas located at the UE 115. In some cases, communications between base station 105 and UE 115 may be associated with increased signal attenuation or reduced signal strength due to various factors such as from compliance to certain MPE guidelines. Other factors may include diffraction, absorption, blockage, and other aspects.

In some examples, reduction in signal strength for communications between base station 105 and UE 115 may occur when one or multiple antennas located at the receiving device are blocked due to interference caused, in part, by the user of UE 115 or some other non-user of UE 115. In one example, a user (or other non-user) may block one or multiple antennas while holding or near UE 115, or the user (or non-user) may cover or block an antenna of UE 115 (e.g., when placing their hand or finger in a certain area of the device). In any case, the position of the user (or non-user) may affect the quality of transmission and reception of signals by the UE 115.

In cases where the position of a body relative to one or more antennas of UE 115 affects the received signal strength, signal quality, or the like, the UE 115 may be configured with one or more sensors (e.g., MPE sensors) that may detect such signal blockage. The sensor may be coupled with one or more other components of the UE 115, which may allow for the UE 115 to signal an indication associated with the detected signal blockage, such as to the user. The UE 115 may provide the indication using a number of different feedback mechanisms, such as visual (e.g., on screen) indications, haptic feedback, light (e.g., an LED lighting up on the UE 115), heat, changes to sound or other device functionality, etc. Providing feedback to the user as to how they may reorient their position relative to UE 115, may reduce experienced signal attenuation and increased communications performance of the UE 115.

Figure 2:
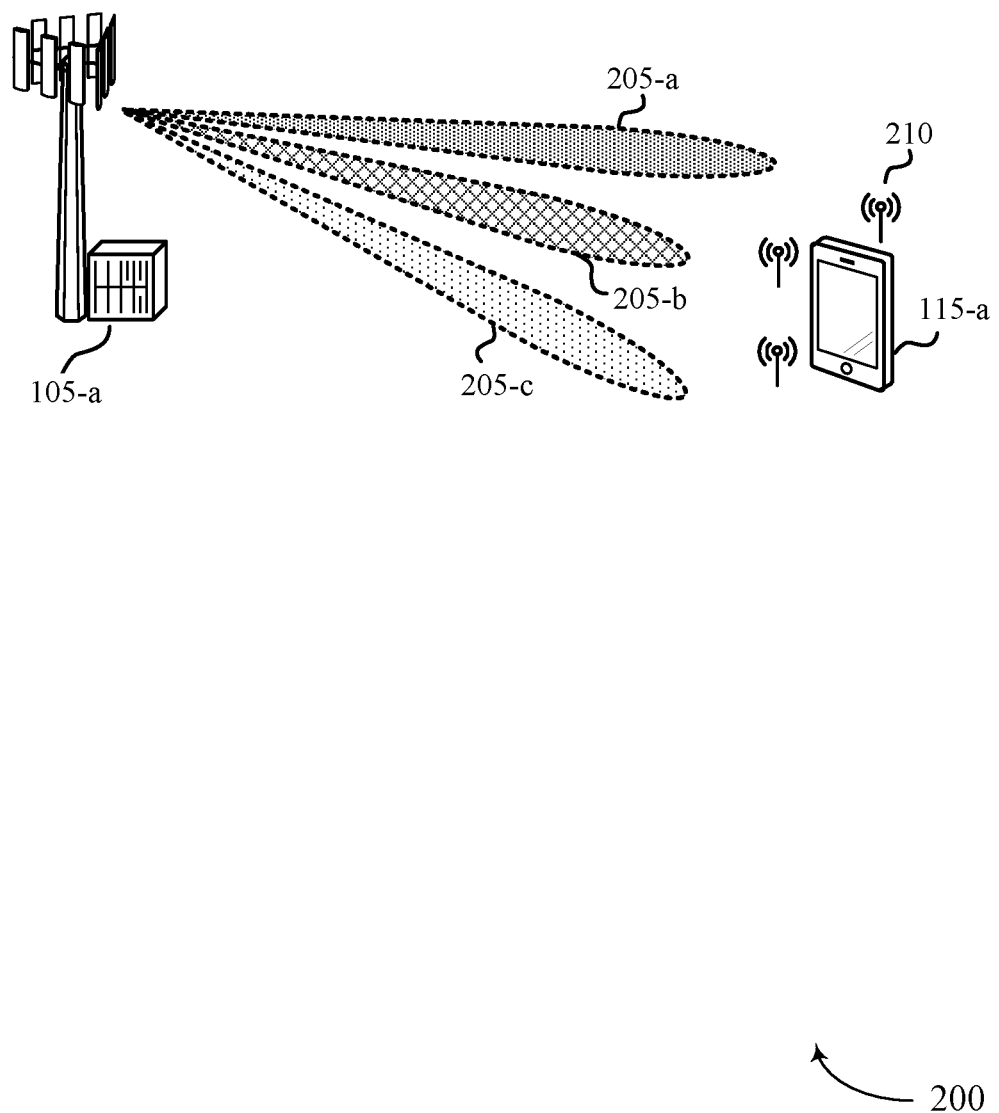
FIG. 2 illustrates an example of a wireless communications system that supports user-involved antenna management in accordance with aspects of the present disclosure.

FIG. 2 illustrates an example of a wireless communications system 200 that supports user-involved antenna management in accordance with aspects of the present disclosure. In some examples, wireless communications system 200 may implement aspects of wireless communications system 100. The wireless communications system 200 may include a bases station 105-a that supports communication with UE 115-a. In some examples, the wireless communications system 200 may support applications of indicating a user of signal attenuation at one more antennas of the UE 115-a.

Devices located in a wireless communications network (e.g., such as wireless communications system 200) may perform a number of beam management procedures in order to monitor beam performance and identify candidate beams to provide a certain quality of service between devices. In some aspects, a transmitting device such as base station 105-a may transmit multiple beamformed signals (e.g., via beams 205) within a coverage area, and a receiving device such as UE 115-a may monitor for the beamformed signals using one or more antennas or antenna components located at the receiving device. In some cases, communications between base station 105-a and UE 115-a may be associated with increased signal attenuation influenced by various factors within the network affecting signal strength. For example, such factors may include reduced signal strength due to reduced UE transmit power resulting from compliance with certain MPE guidelines. Other factors may include diffraction, absorption, blockage, and other aspects that may induce path-loss or interference.

Further signal attenuation may occur when one or multiple of the antennas 210 located at UE 115-a are blocked due to a user's body presence (e.g., interference), or some other body presence, such as a non-user, animal, etc. Such interference may further limit communication performance while reducing the signal strength as received by the UE 115-a. In one example, a user may block one or multiple antennas 210 while holding UE 115-a in a certain way, or the user may orient UE 115-a in their hand in such a way that impedes communications between UE 115-a and other devices in the network. For example, the user may cover or block an antenna 210 at UE 115-a when placing their hand or finger in a certain area of the device. Thus, it may be desirable to inform the user of potential antenna blockage and how they may be able to reorient their finger or hand in order to avoid blockage and improve the link quality for their device.

In some other cases, base station 105-a and UE 115-a may select a beam 205 (e.g., a best beam, a preferred beam) to use for communications. For example, base station 105-a and UE 115-a may determine that one of beams 205-a, 205-b, or 205-c is the beam with the highest downlink signal strength, best reference signal received power or quality (reference signal received power (RSRP) or reference signal received quality (RSRQ)) value, etc. However, when the selected beam 205 arrives at UE 115-a, one or more of the antennas 210 selected to receive the beam 205 may be blocked in some way by the user. In such cases, the user may be subject to a higher RF energy from the transmitted beam 205 (as their hand or tissue is absorbing and/or reflecting the beam selected with largest downlink strength), and may also experience poor signal quality due to the blockage of the antenna. In such cases, beam reselection may occur (e.g., the base station 105-a of the UE 115-a may pick a different beam that is not impacted by interference), however, it may be desirable to inform the user to move their finger or hand to achieve better signal quality for the originally selected beam 205 to achieve improved performance for their device. In particular, decreased wireless performance due to signal blockage may negatively affect user experience, and it may be beneficial to implement techniques that help a user in improving signaling quality (where they may not have been previously aware of potentially user-created signal blockage).

Some wireless communication devices, such as UE 115-a, may be configured with a capability to detect the presence of human skin at or near the device, for example, by using a sensor or detector such as a near-field MPE sensor or similar component. The MPE sensor may be coupled with various other components of the UE 115-a (e.g., such as a device modem), and may inform other device components which received beams may be intercepted by tissue (e.g., body tissue, human tissue, animal tissue, some other tissue). Stated alternatively, an MPE sensor may inform UE 115-a of which antennas are near to or blocked by tissue.

The MPE sensor may provide feedback to various other components of UE 115-a (e.g., feedback may be sent to a device modem, application processor, sensor processor, etc.) as to which antennas are blocked, and the device may inform the user which antennas are impacted by blockage or attenuation. In some aspects, the device may inform the user how the user could potentially move their body to improve the link quality by removing the detected blockage. UE 115-a may then inform the user using a number of different feedback mechanisms. The user may then move their hand or finger away from the receiving antennas 210, which may increase the received signal strength, and may improve overall communications quality including both uplink and downlink performance between base station 105-a and UE 115-a. The described techniques may therefore improve wireless communications efficiency, quality, and performance. As such, the use of applications and services that rely on certain performance and reliability metrics (e.g., low-latency applications, mobile gaming, etc.) may achieve enhanced performance through user-involved antenna management.

In addition, in cases where user involvement allows for the UE 115-a to select a better beam (e.g., a beam with higher signal strength), battery performance may be increased. For example, the UE 115-a may have longer battery life as a result of selecting a beam with higher strength. In such cases, the UE 115-a may transmit the same data in a shorter burst, with higher efficiency and with fewer retransmissions. In addition, the UE 115-a may transmit the data across fewer resources, which may consume less power at the UE 115-a. As a result of the user moving their position, the modem of UE 115-a may return to a low power mode or a sleep state to conserve and extend the battery life of the device.

Figure 3A:
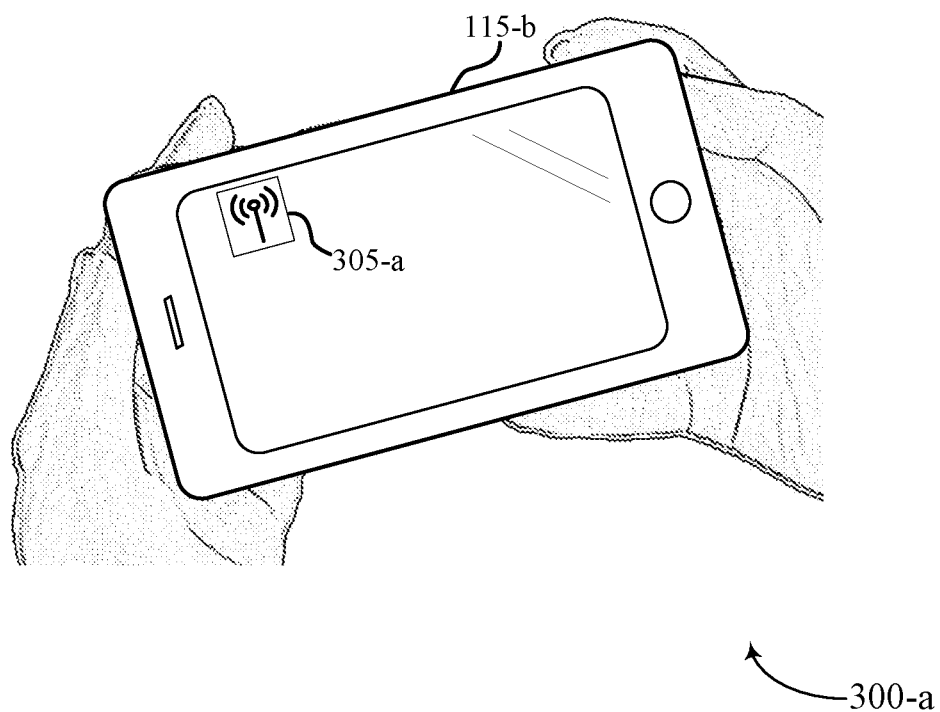
FIGS. 3A and 3B illustrate examples of interference indications that support user-involved antenna management in accordance with aspects of the present disclosure.
Figure 3B:
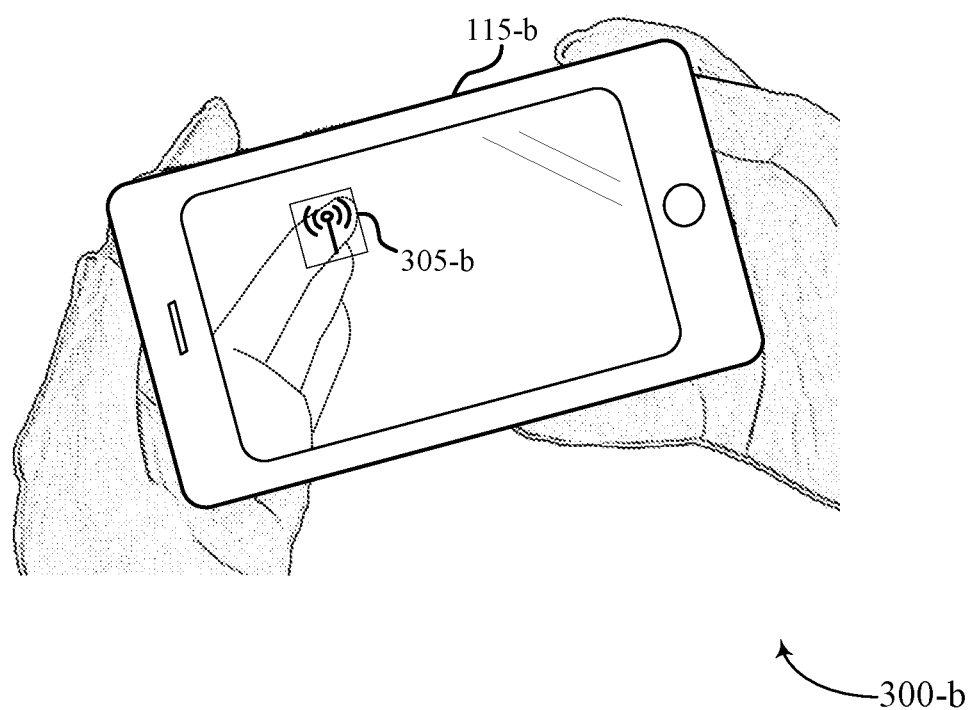

FIGS. 3A and 3B illustrate examples of interference indications 300-a and 300-b that support user-involved antenna management in accordance with aspects of the present disclosure. In some examples, interference indications 300-a and 300-b may implement aspects of wireless communications system 100.

In some cases, a UE 115-b may be configured with an ability to detect the presence of tissue (e.g., body tissue, human tissue, animal tissue, or some other tissue) at or near to antennas present in the device using a sensor or detector, such as a near field MPE sensor. The MPE sensor may, in some cases, detect signal blockage (for example, due to a user's hand positioning at UE 115-b) affecting one or more antennas at UE 115-b.

UE 115-b or a component of UE 115-b may then inform the user or inform one or more other components of UE 115-b of the detected signal blockage using a number of different feedback mechanisms 305 such as visual (e.g., on screen) indications, haptic feedback, light (e.g., lighting up on the case via visible light or invisible light), heat, changes to sound or other device functionality, etc. In some cases, the feedback may occur on the structure of the UE 115 (e.g., encasement, body of the UE 115) or on the edge of UE 115. In the case of FIG. 3A, the user may be blocking an antenna at an edge of UE 115-b (e.g., the top left portion of UE 115-b) which may correspond to an in-use antenna, such that indication 305-a appears on screen to notify the user of the blocked antenna and/or the corresponding signal blockage. In the case of FIG. 3B, the user may be blocking an antenna located at the back side of UE 115-b, such that the on-screen indication 305-b appears to notify the user. Notification 305-a and notification 305-b may take a number of different forms, as described herein.

UE 115-b may take various factors into account when determining to notify the user of blockage for a specific antenna element using an indication 305. For example, UE 115-b may consider the result of the MPE detector indicating presence of human tissue near the antenna element, a percentage of time different antennas are used, a link budget dropping below a threshold, the frequency of backing off transmit power (e.g., to comply with MPE requirements), the type of communications at the device (e.g., low latency, high reliability, etc.), etc. By signaling the user to reposition their hand on the device (or to otherwise reorient their body relative to the device), the antennas of UE 115-b may become free of obstruction, and improved radio link quality may be achieved.

In addition, the MPE sensor may be used at UE 115-b to improve communications when human tissue is not detected in various areas of the device. For example, UE 115-b may select a beam with a higher transmit power and higher throughput when no human tissue is detected. Similarly, UE 115-b may select a beam with lower transmit power and lower throughput when human tissue is detected (in order to comply with MPE requirements). In addition, UE 115-b may be able to inform the user via an indication 305 to move in such a way that allows the MPE sensor to detect no tissue, which may allow the UE 115-b to select a higher strength beam to improve communications quality in addition to other secondary improvements such as increased battery life and application performance, along with reduced interference with other devices, etc.

Various components of UE 115-b may be coupled with the MPE sensor or detector, and the components may in some aspects indicate one or more antennas that are affected by signal attenuation due to the presence of human tissue covering or blocking the one or more antennas. For example, a modem (e.g., a mmW modem, a sub-6 modem for NR, LTE, WLAN, etc. communications) may provide an application programming interface (API) to an application process that may indicate portions or reference to antenna patches of UE 115-b where preferred beams are blocked by human tissue. In some cases, the modem may indicate a list of potential antennas that are blocked by tissue, where the list may include antenna ranked by communications importance to the modem. In some cases, the modem may provide the list of beams that are blocked to UE 115-b, and UE 115-b may provide an indication 305 to the user to inform them of certain antennas that are attempting to receive the beams, but are blocked by the positioning of the user's body. The indication 305 may in some aspects prompt the user to move in such a way to reduce interference and achieve improved radio link quality.

In some cases, a user may orient their hand at a device in such a way that blocks multiple receiving antennas at the device. In such cases, UE 115-b (e.g., the modem) may determine to inform the user of blockage at only one of the multiple blocked antennas, or UE 115-b may determine to inform the user of blockage at more than one of the multiple blocked antennas. A number of different inputs may be used to identify cases where the device may notify the user of one or multiple blocked antennas.

A first input may involve UE 115-b or a modem of UE 115-b informing the user of one or multiple blocked antennas based on an amount of time that a given antenna is in use, and/or by comparing the amount of time that one antenna is used relative to an amount of time a different antenna is used. In addition to the time an antenna is used, the UE 115-b may be able to learn (e.g., with artificial intelligence (AI)) and/or classify the best beams to use based on other sensor information, such as location and orientation information. For example, the UE 115-b may use GPS, magnetic sensors, accelerometers, nearby WIFI/Bluetooth devices, etc.

In some cases, UE 115-b may determine a percentage of absolute time that each antenna is in use (e.g., for transmission or reception), and may compare this percentage to a certain threshold percentage (e.g., threshold1). In cases where the determined percentage of absolute time that the antenna is in use exceeds the threshold percentage, and the antenna is determined to be blocked by human tissue, then UE 115-*b* may inform the user of the blockage using an indication 305.

In another case, UE 115-*b* may determine a percentage of time that an antenna is in use (e.g., for transmission or reception) relative to a different antenna, and may compare this percentage to a certain threshold percentage (e.g., threshold2). In some cases, UE 115-*b* may determine the percentage of time that the antenna is used relative to most used antenna is in use. In cases where the determined percentage of time that the antenna exceeds the threshold percentage, and the antenna is determined to be blocked by human tissue, then UE 115-*b* may inform the user of the blockage using an indication 305.

In some examples, the MPE sensor at UE 115-*b* may detect blockage at multiple (e.g., three) antennas. UE 115-*b* may determine a metric related to the amount of time each antenna is in use. For example, UE 115-*b* may determine that a first antenna (e.g., antenna 1) is used 20 percent of the time, and a second antenna (e.g., antenna 2) is used 15 percent of the time. Comparing the usage of the first antenna and the second antenna may allow UE 115-*b* to determine the amount of time the second antenna is used compared to the first antenna. In this example, the second antenna is used 75 percent of the time that the first antenna is used (e.g., 15 percent/20 percent), which may indicate frequent usage of the second antenna relative to the first antenna. In some cases, if this percentage exceeds a threshold (e.g., threshold2), then UE 115-*b* may determine to report the blockage of both antennas to the user. In some other cases, if this percentage is below the threshold, then UE 115-*b* may determine to report only one antenna to the user (e.g., the most frequently used antenna; antenna 1), or UE 115-*b* may determine to report neither antenna to the user.

In addition, UE 115-*b* may determine that a third antenna is used for 5 percent of the time. Comparing the usage for the first antenna and the second antenna may indicate that the third antenna is used for 25 percent of the time that the first antenna is used (e.g., 5 percent/20 percent). If this percentage is below the threshold (e.g., threshold 2), then UE 115-*b* may determine not to report the third antenna to the user. In some cases, UE 115-*b* may report all three antennas to the user. In some other cases, UE 115-*b* may report antenna 1 and antenna 2 to the user, but may refrain from reporting antenna 3. In some other cases, UE 115-*b* may determine to report all antennas, or may determine to report none of the antennas. By comparing the relative usage of multiple antennas, the determination to report certain blocked antennas made by UE 115-*b* may be independent of the type of traffic (e.g., low latency, high reliability traffic, high-priority traffic) UE 115-*b* may be configured to receive. In addition to metrics based on the time an antenna is used, the UE 115-*b* may be able to adaptively learn (e.g., with AI) which beams to use based on information UE 115-*b* may receive from other sensors, such as location and orientation information (e.g., GPS, magnetic sensor, accelerometer, nearby devices such as WIFI/Bluetooth devices, etc.).

A second input that may be used to identify cases where UE 115-*b* may notify the user of one or multiple blocked antennas may include UE 115-*b* determining that the link budget is poor (e.g., is below a threshold link budget) as a result of the user blocking one or more of the multiple antennas at UE 115-*b*. In some cases, the threshold link budget may be determined based on a number of factors such as RSRP, RSRQ, neighbor cells, modulation and coding scheme (MCS) value, power headroom on uplink and downlink, etc. In some cases, UE 115-*b* may determine that the link budget is satisfactory (e.g., satisfies or exceeds the threshold link budget), even if one or more antennas are determined to be blocked by the user. As a result, UE 115-*b* may determine to not notify the user of the blocked antenna via an indication 305.

A third input that may be used to identify cases where UE 115-*b* may notify the user of one or multiple blocked antennas may be related to the detected proximity of human tissue to one or more of the blocked antennas. For example, if UE 115-*b* or a component of UE 115-*b* (e.g., an MPE sensor) determines that human tissue is within a threshold proximity, UE 115-*b* may indicate such a determination to the user using an indication 305. In addition, in some wireless communication systems (e.g., NR systems), UE 115-*b* may apply MPE related power backoff frequently to mitigate RF exposure effects to the user, which in some cases, may include reducing power for uplink communications as compared to downlink communications.

MPE backoff may impact various aspects of uplink and downlink communications, such as the latency and throughput associated with the communications. Physical uplink control channel (PUCCH) and physical uplink shared channel (PUSCH) communications may also be impacted by MPE constraints. For example, downlink throughput efficiency may be impacted if UE 115-*b* is unable to send feedback transmissions to a base station (e.g., HARQ/ACK feedback) due to MPE constraints. The base station may then re-send information unnecessarily to the UE 115-*b*, which may decrease communications efficiency in the network. According to some aspects, by notifying the user to reorient themselves such that their proximity to various antennas is decreased, UE 115-*b* may apply MPE-related power backoff less frequently, thus increasing communications throughput and overall communications efficiency in the network. PUSCH performance may be directly impacted when the UE reduces transmit power to meet regulatory requirements.

A fourth input that may be used to identify cases where UE 115-*b* may notify the user of one or multiple blocked antennas may be related to the type of communications or services supported by UE 115-*b*. For example, in some cases, UE 115-*b* may be configured for low latency or high reliability communications (e.g., URLLC communications, communications with low BLER target). In such cases, if an MPE sensor detects signal blockage due to human tissue, UE 115-*b* may report such blockage to the user via an indication 305, which may help decrease the latency and increase signal strength for communications at the device. For example, in cases where UE 115-*b* is configured for low-latency, high reliability communications, UE 115-*b* may report signal blockage due to human tissue to the user more frequently than UE 115-*b* may if the device was not indicated for low latency and high reliability.

A number of other inputs may be used to identify cases where UE 115-*b* may notify the user of one or multiple blocked antennas, and UE 115-*b* may dynamically adapt to changes in a user's hand position among other factors that may affect signal blockage and overall radio link quality.

In some other cases, UE 115-*b* may provide advanced feedback to the user, which may indicate different variables that may be affecting communications quality. As such, different types of feedback indications 305 may be produced to indicate different types of blockage issues. In one case, feedback resolution or granularity may change, such that the intensity of feedback is proportional to the blockage issue.

In one example, in cases where a light may be used to indicate blockage, the intensity or brightness of the light may increase as the signal becomes more blocked. In some cases, some antenna elements that are reported by the modem may be not reported to the end user to avoid requesting too much from the end user (e.g., to avoid prompting the user to move too frequently, or in ways that negatively impact their user experience). In some cases, the indication may appear for a limited amount of time, even if the underlying issue remains, for example, to avoid constantly taking the user's attention.

In another case, feedback dimensionality may change, such that feedback reports may change according to different kinds of blockage issues. For example, UE 115-b may use different colors of light to indicate different issues (e.g., one color indicates RSRP issues, one color indicates power headroom, one color indicates the amount of blockage, etc.). Such increased feedback dimensionality may allow the user to learn how to overcome various types of blockage issues at their device, and may allow for increased user involvement in improving communications quality.

In some aspects, UE 115-b may also include passive features that may dissuade a user from positioning themselves in a way that blocks one or more antennas of UE 115-b. As one example, UE 115-b may have some physical features (e.g., indentation, notches, spikes, clammy material, or the like) that may discourage a user from blocking the antennas and antenna arrays/panels of UE 115-b. In any case, as described herein, through active and/or passive notification the user may be made aware of signal blockage caused by a position of the user relative to one or more antennas.

Figure 4:
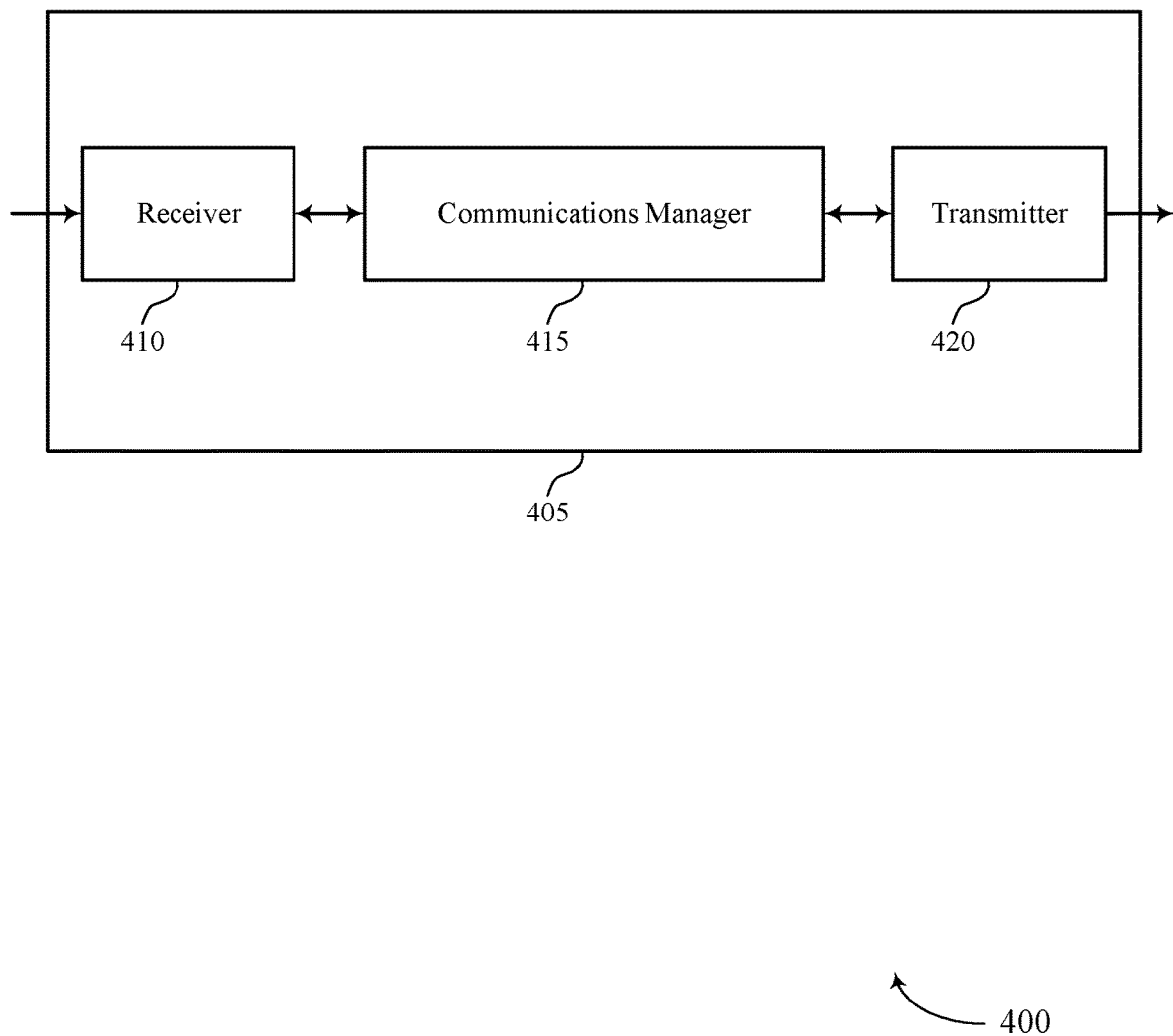
FIGS. 4 and 5 show block diagrams of devices that support user-involved antenna management in accordance with aspects of the present disclosure.

FIG. 4 shows a block diagram 400 of a device 405 that supports user-involved antenna management in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to user-involved antenna management, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may detect a signal blockage affecting one or more antennas of the UE, the signal blockage associated with a position of a body relative to the one or more antennas and signal an indication associated with the detected signal blockage based on the detected signal blockage. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver. For example, the transmitter 420 may be an example of aspects of the transceiver 720 described with reference to FIG. 7. The transmitter 420 may utilize a single antenna or a set of antennas.

The communications manager 415 as described herein may be implemented to realize one or more potential advantages. One implementation may allow the device 405 to more efficiently perform uplink and downlink communications by implementing techniques to mitigate obstruction of one or more antennas of the device 405. For example, a device 405 determine that one or more antennas of the device are being blocked by the user of the device 405 and the device 405 may indicate this blockage to the user.

Based on implementing the antenna blocking mitigation techniques as described herein, a processor of a UE 115 (e.g., controlling the receiver 410, the transmitter 420, or the transceiver 720 as described with reference to FIG. 7) may increase reliability and efficiency in the communication of downlink and/or uplink signals between a UE 115 and one or more base stations.

Figure 5:
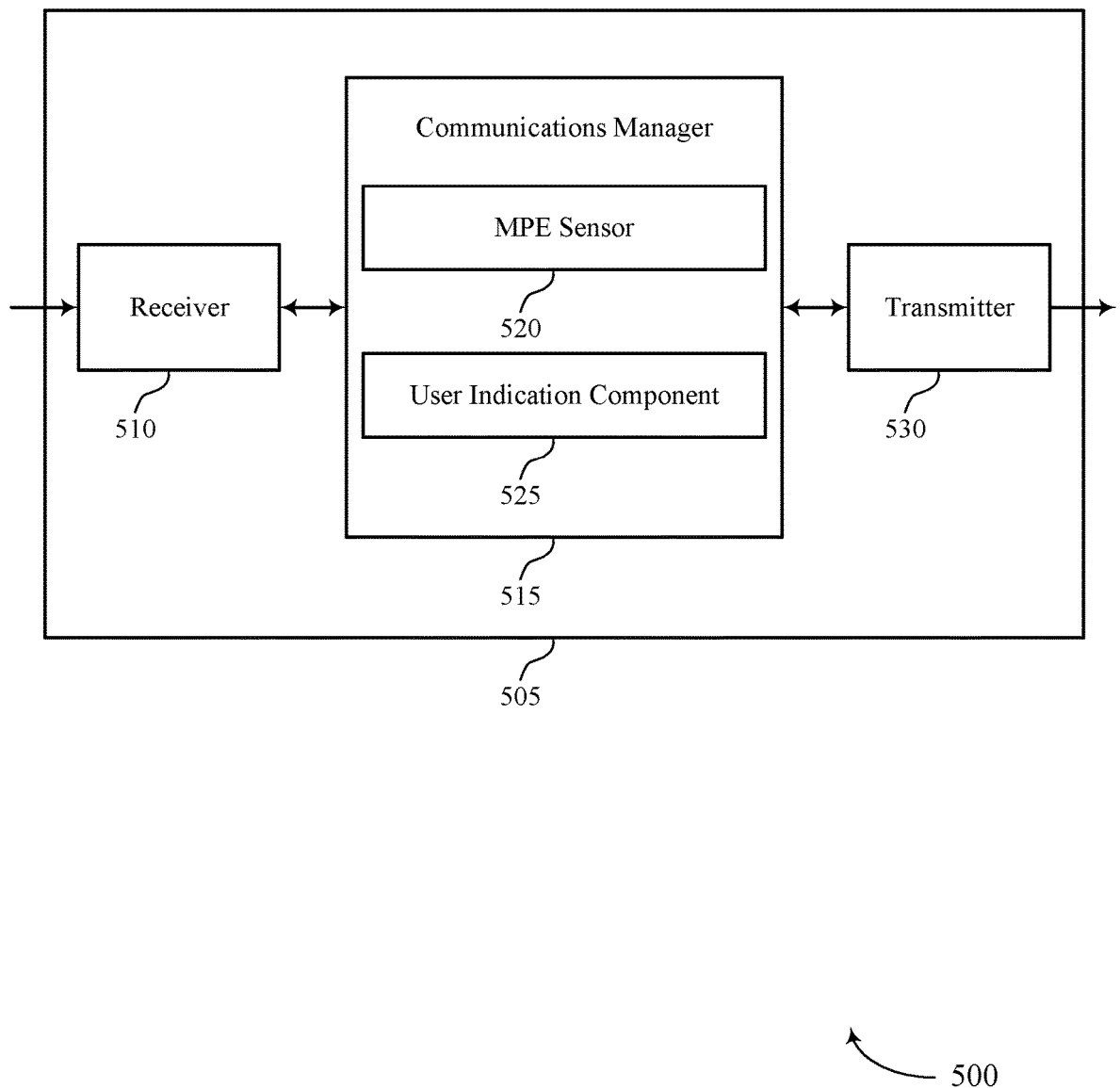

FIG. 5 shows a block diagram 500 of a device 505 that supports user-involved antenna management in accordance with aspects of the present disclosure. The device 505 may be an example of aspects of a device 405, or a UE 115 as described herein. The device 505 may include a receiver 510, a communications manager 515, and a transmitter 530. The device 505 may also include a processor. Each of these components may be in communication with one another (e.g., via one or more buses).

The receiver 510 may receive information such as packets, user data, or control information associated with various information channels (e.g., control channels, data channels, and information related to user-involved antenna management, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include an MPE sensor 520 and a user indication component 525. The communications manager 515 may be an example of aspects of the communications manager 710 described herein.

The MPE sensor 520 may detect a signal blockage affecting one or more antennas of the UE, the signal blockage associated with a position of a body (e.g., a body of a user, a body of a non-user, a body of an animal) relative to the one or more antennas. In some cases, the MPE sensor 520 may be referred to by other terminology. However, it is understood that the MPE sensor 520 may be any device or component which is capable of detecting tissue (e.g., human tissue, animal tissue, or any other tissue) at or near a sensing device. Further, the MPE sensor 520 may also be capable of determining when there is no tissue nearby the sensing device, which may therefore enable an increase in transmit power (e.g., because MPE or other similar requirements may be relaxed in the absence of human tissue). In any case, it is understood that the term "MPE sensor" should not be considered limiting, and other components or devices may perform the same functionality as the described MPE sensor 520.

The user indication component 525 may signal an indication associated with the detected signal blockage.

The transmitter 530 may transmit signals generated by other components of the device 505. In some examples, the transmitter 530 may be collocated with a receiver 510 in a transceiver. For example, the transmitter 530 may be an example of aspects of the transceiver 720 described with reference to FIG. 7. The transmitter 530 may utilize a single antenna or a set of antennas.

In some examples, communications manager 515 may be implemented as an integrated circuit or chipset for a mobile device modem, and the receiver 510 and transmitter 520 may be implemented as analog components (e.g., amplifiers, filters, antennas, etc.)

coupled with the mobile device modem to enable wireless transmission and reception.

The communications manager 515 as described herein may be implemented to realize one or more potential advantages. Various implementations may enable mitigation of interference (e.g., interference caused by one signal blockage by the position of the user) at one or multiple antennas of the device 505 containing communications manager 515. At least one implementation may enable the user to effectively increase communications performance of device 505, for example, by moving their hand or finger away from a receiving antenna. At least one implementation may enable communications manager 515 to increase the throughput to device 505 as a result of decreased interference.

Based on implementing the techniques for user-involved antenna management as described herein, one or more processors of the device 505 (e.g., processor(s) controlling or incorporated with one or more of receiver 510, communications manager 515, and transmitter 520) may reduce latency of communications and may increase overall quality and efficiency of communications for the device 505. In addition, the device 505 may notify the user to change their position (e.g., the placement of their hands, fingers, or other tissue(s) in contact with the device 505) to avoid intercepting a beam and/or antenna array, thus reducing the potential RF exposure to the user while simultaneously improving link quality.

Figure 6:
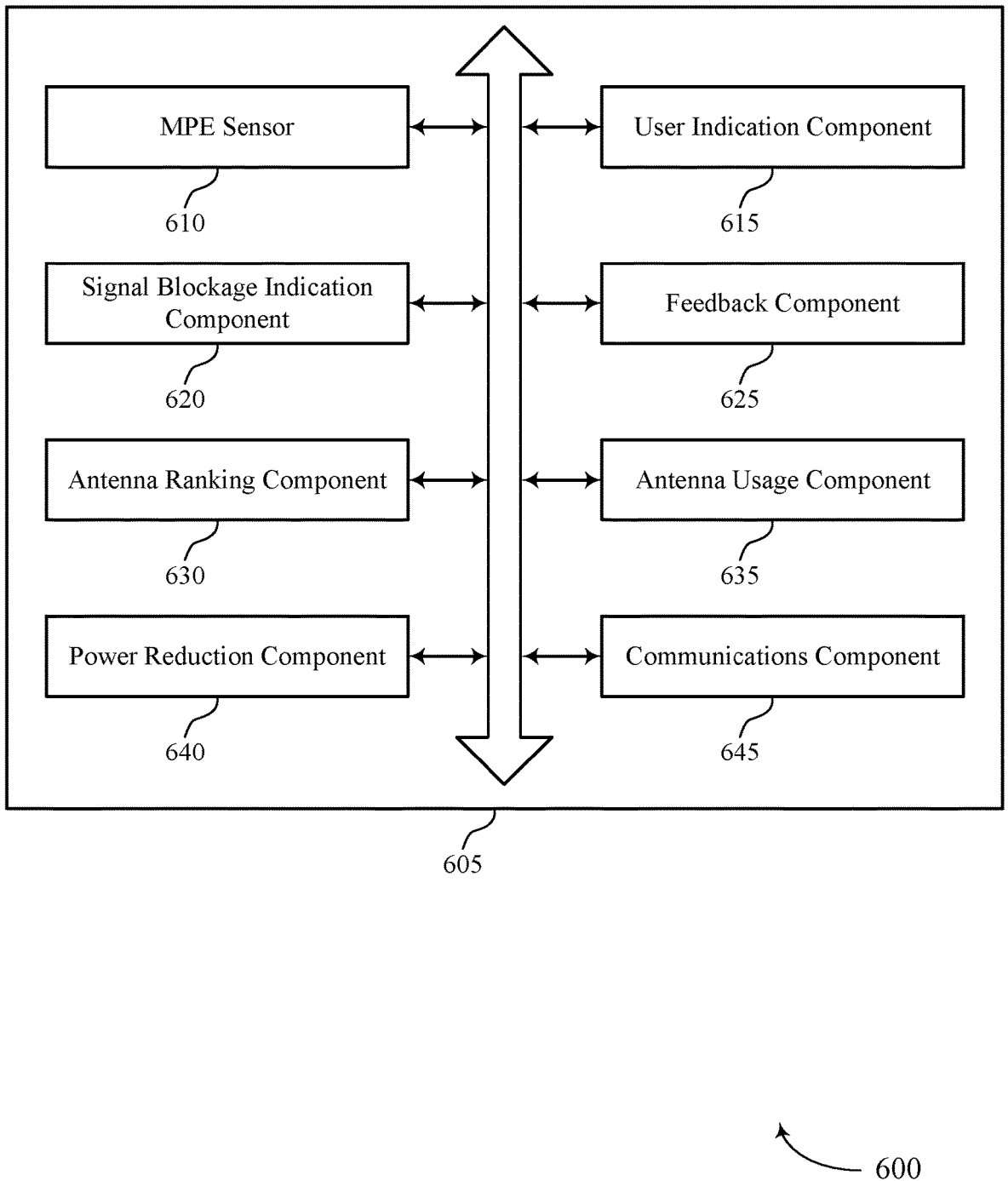
FIG. 6 shows a block diagram of a communications manager that supports user-involved antenna management in accordance with aspects of the present disclosure.

FIG. 6 shows a block diagram 600 of a communications manager 605 that supports user-involved antenna management in accordance with aspects of the present disclosure. The communications manager 605 may be an example of aspects of a communications manager 415, a communications manager 515, or a communications manager 710 described herein. The communications manager 605 may include an MPE sensor 610, a user indication component 615, a signal blockage indication component 620, a feedback component 625, an antenna ranking component 630, an antenna usage component 635, a power reduction component 640, and a communications component 645. Each of these components may communicate, directly or indirectly, with one another (e.g., via one or more buses).

The MPE sensor 610 may detect a signal blockage affecting one or more antennas of the UE, the signal blockage associated with a position of a body relative to the one or more antennas. In some examples, the MPE sensor 610 may determine a type of signal blockage affecting the one or more antennas, where the indication may be based on the type of signal blockage. In some cases, each antenna of the one or more antennas may be part of one or more antenna arrays configured for mmW communications.

In some examples, the MPE sensor 610 may receive downlink signaling at the one or more antennas of the UE, where detecting the signal blockage is based on the received downlink signaling.

In some cases, the detected signal blockage is caused by tissue (e.g., human tissue) of the body near the one or more antennas based on the position of the body. The user indication component 615 may signal an indication (e.g., to the user) associated with the detected signal blockage based on the detected signal blockage. In some examples, the indication associated with the detected signal blockage includes an indication to change the position of the body.

The signal blockage indication component 620 may signal an indication of a location of at least one antenna of the one or more antennas affected by the signal blockage. As an example, the indication may include one or more of a value, index, or other identifier that is associated with a particular antenna (or multiple antennas), which may have some location at, on, or within, the UE.

The signal blockage indication component 620 may signal, to a user, the indication via an interface of the UE. The feedback component 625 may generate haptic feedback indicating the detected signal blockage, visual feedback indicating the detected signal blockage, thermal feedback indicating the detected signal blockage, audio feedback indicating the detected signal blockage, or any combination thereof. In some examples, the visual feedback may include an on-screen indication, an indication on a structure of the UE, an indication on an edge of the UE, an indication via visible light, or an indication via invisible light, or a combination thereof.

In some examples, the feedback component 625 may adjust an intensity or frequency of feedback indicating the signal blockage, where the intensity of the feedback is based on a severity of the detected signal blockage.

The antenna ranking component 630 may rank the one or more antennas of the UE (e.g., based on an importance to a modem), where the indication associated with the detected signal blockage is based on the ranking.

The antenna usage component 635 may identify a usage amount for each antenna of the one or more antennas, where signaling the indication associated with the detected signal blockage is based on the determined usage amount for each antenna and a signal blockage at each antenna.

In some examples, the antenna usage component 635 may calculate a respective percentage of time that each antenna of the one or more antennas is used, where signaling the indication is based on a percentage of time for at least one antenna of the one or more antennas satisfying a threshold. In addition, signaling the indication may be based on an ability of the UE to learn which beams to use based on a collection of other sensor information, such as location and orientation information (e.g., GPS, magnetic sensor, accelerometer, nearby devices such as WIFI/Bluetooth devices, etc.). Thus, in some examples, signaling the indication associated with the detected signal blockage may be based on determined sensor information including a location of the UE, an orientation of the UE, or a combination thereof.

In some examples, the antenna usage component 635 may calculate a respective fraction of time that each antenna of the one or more antennas is used relative to another antenna of the one or more antennas, where signaling the indication associated with the detected signal blockage is based on the respective fraction of time for at least one antenna of the one or more antennas satisfying a threshold.

In some examples, the antenna usage component 635 may identify a link budget for the one or more antennas, where signaling the indication associated with the detected signal blockage is based on the link budget satisfying a threshold. In some cases, the usage amount is based on uplink communications, downlink communications, or a combination thereof.

In some cases, the link budget for the one or more antennas is based on an RSRP, an RSRQ, one or more neighboring cells, an MCS, a power headroom, uplink transmissions, downlink transmissions, or a combination thereof.

The power reduction component 640 may determine a frequency of reducing a transmission power for the one or more antennas, where signaling the indication associated with the detected signal blockage is based on the determined frequency satisfying a threshold. In some cases, the transmission power is reduced based on a proximity of tissue to the one or more antennas.

The communications component 645 may determine a type of communications by the UE, where signaling the indication associated with the detected signal blockage is based on the determined type of communications. In some cases, the type of communications includes high-priority communications, low-latency communications, or a combination thereof.

Figure 7:
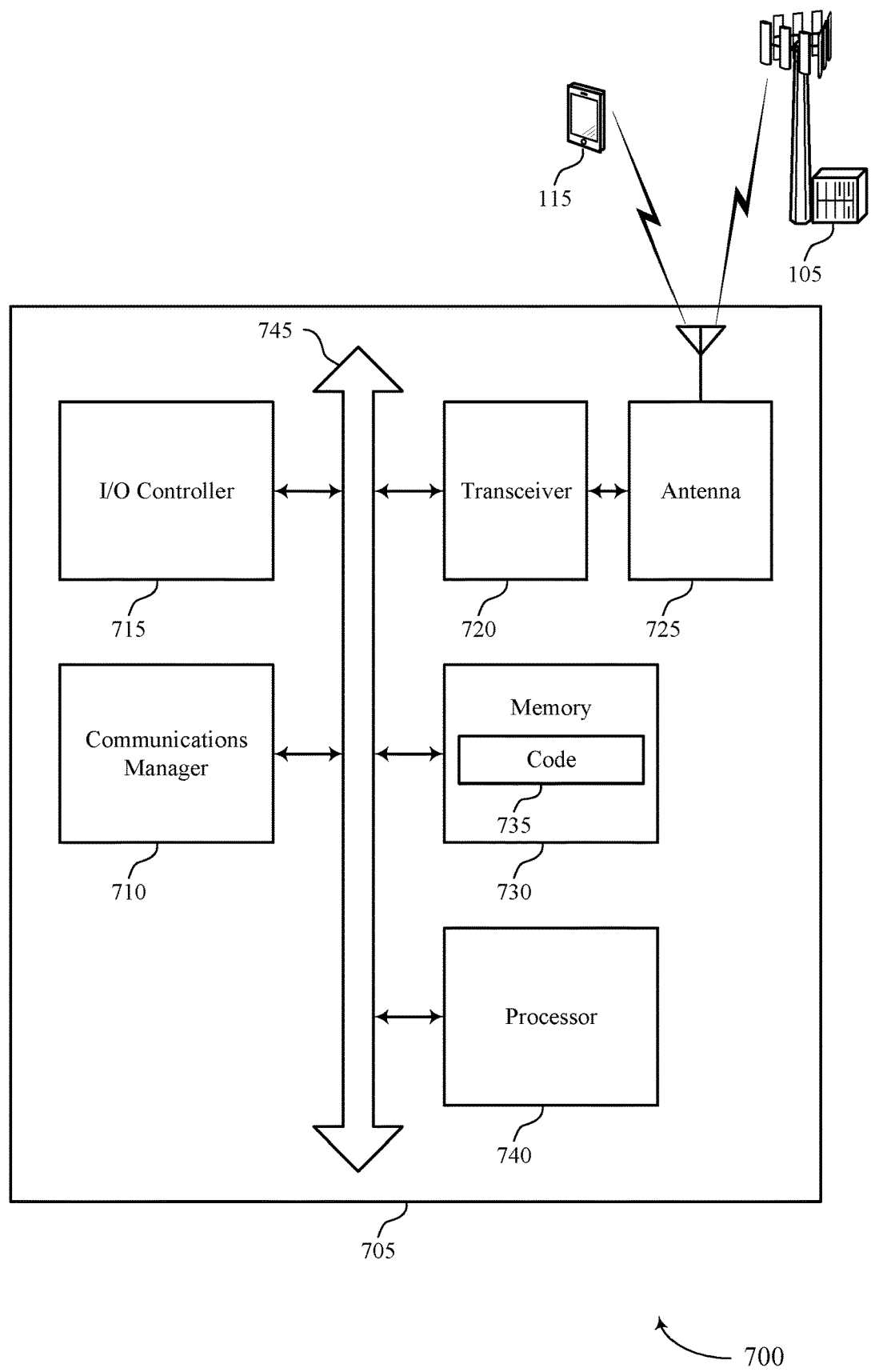
FIG. 7 shows a diagram of a system including a device that supports user-involved antenna management in accordance with aspects of the present disclosure.

FIG. 7 shows a diagram of a system 700 including a device 705 that supports user-involved antenna management in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may detect a signal blockage affecting one or more antennas of the UE, the signal blockage associated with a position of a body relative to the one or more antennas and signal an indication associated with the detected signal blockage.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a body may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting user-involved antenna management).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
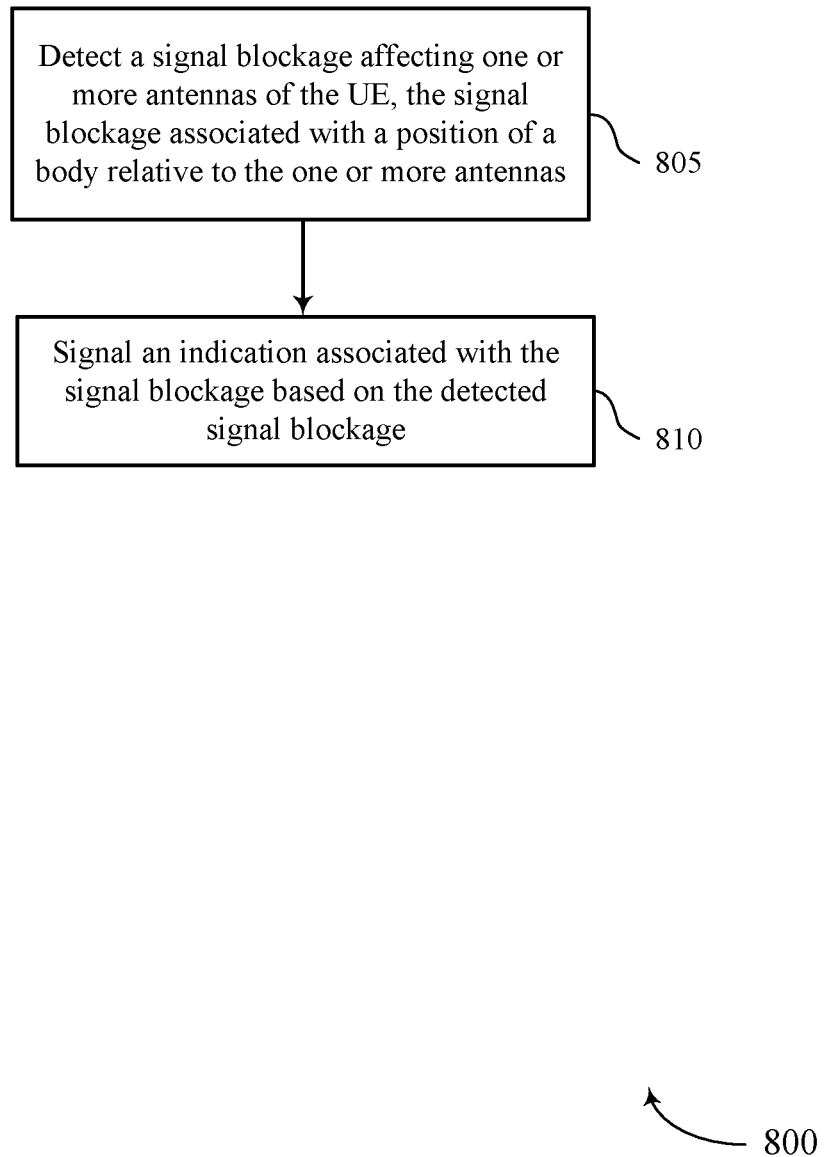
FIGS. 8 through 12 show flowcharts illustrating methods that support user-involved antenna management in accordance with aspects of the present disclosure.

FIG. 8 shows a flowchart illustrating a method 800 that supports user-involved antenna management in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 805, the UE may detect a signal blockage affecting one or more antennas of the UE, the signal blockage associated with a position of a body relative to the one or more antennas. The operations of 805 may be performed according to the methods described herein. In some examples, aspects of the operations of 805 may be performed by an MPE sensor as described with reference to FIGS. 4 through 7.

At 810, the UE may signal an indication associated with the detected signal blockage based on the detected signal blockage. The operations of 810 may be performed according to the methods described herein. In some examples, aspects of the operations of 810 may be performed by a user indication component as described with reference to FIGS. 4 through 7.

Figure 9:
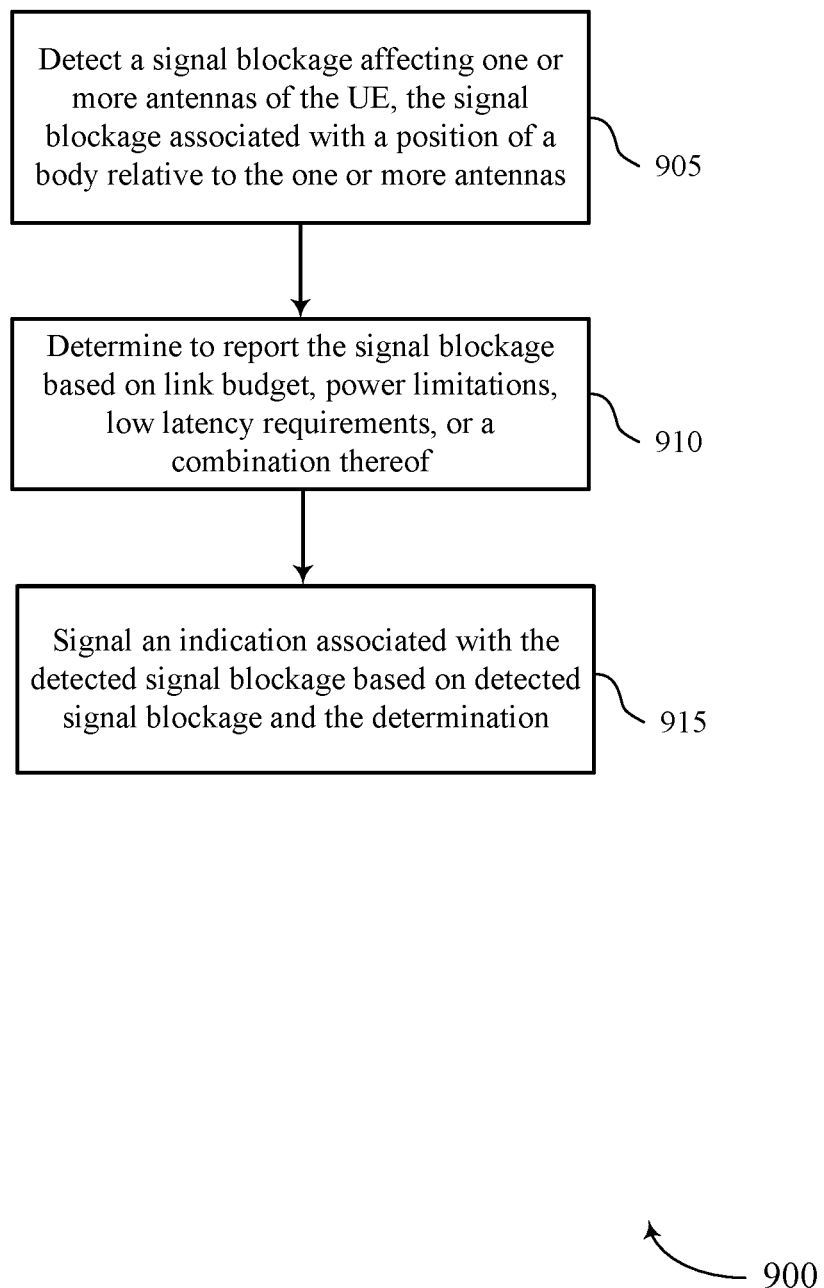

FIG. 9 shows a flowchart illustrating a method 900 that supports user-involved antenna management in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 905, the UE may detect a signal blockage affecting one or more antennas of the UE, the signal blockage associated with a position of a body relative to the one or more antennas. The operations of 905 may be performed according to the methods described herein. In some examples, aspects of the operations of 905 may be performed by an MPE sensor as described with reference to FIGS. 4 through 7.

At 910, the UE may determine to report the signal blockage based on link budget, power limitations, low-latency requirements, or a combination thereof. The operations of 910 may be performed according to the methods described herein. In some examples, aspects of the operations of 910 may be performed by a user indication component as described with reference to FIGS. 4 through 7.

At 915, the UE may signal an indication associated with the detected signal blockage based on the determination and the detected signal blockage. The operations of 915 may be performed according to the methods described herein. In some examples, aspects of the operations of 915 may be performed by a user indication component as described with reference to FIGS. 4 through 7.

Figure 10:
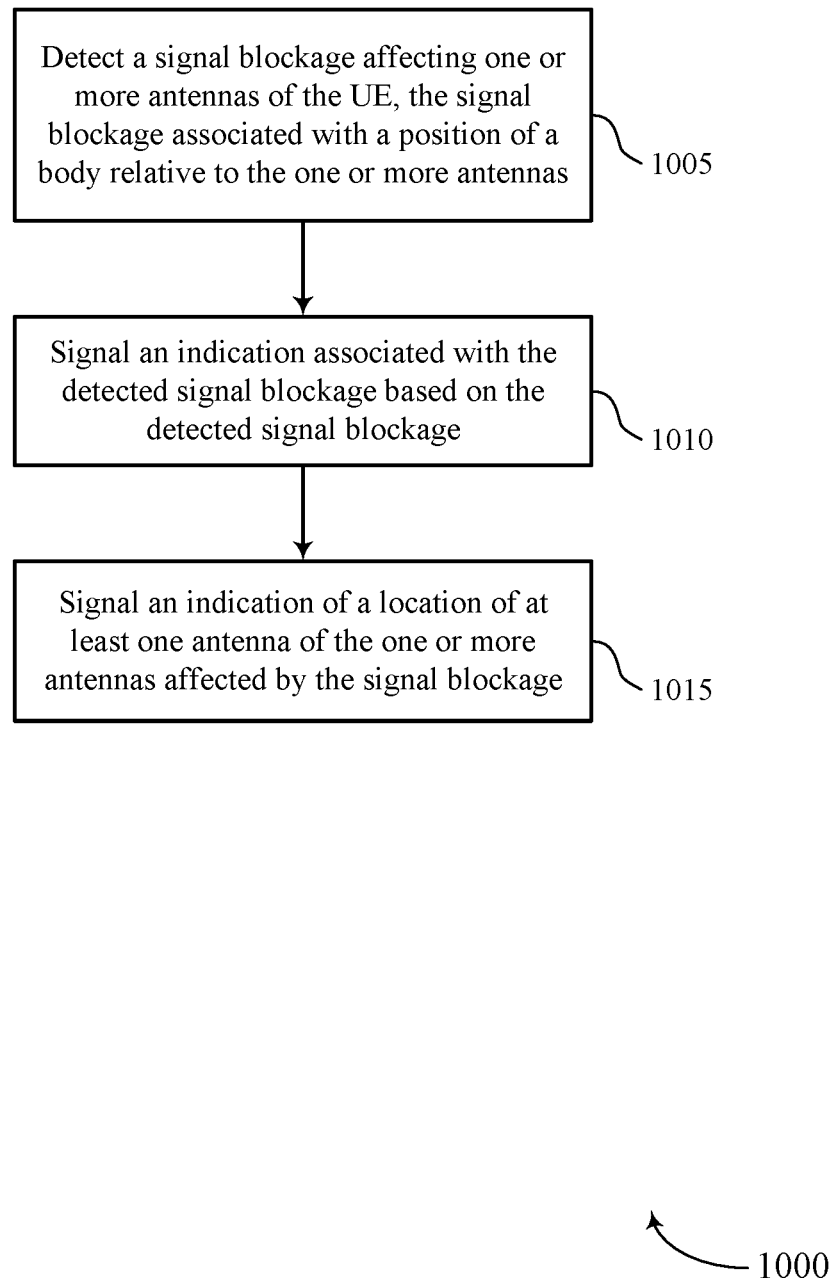

FIG. 10 shows a flowchart illustrating a method 1000 that supports user-involved antenna management in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1005, the UE may detect a signal blockage affecting one or more antennas of the UE, the signal blockage associated with a position of a body relative to the one or more antennas. The operations of 1005 may be performed according to the methods described herein. In some examples, aspects of the operations of 1005 may be performed by an MPE sensor as described with reference to FIGS. 4 through 7.

At 1010, the UE may signal an indication associated with the detected signal blockage based on the detected signal blockage. The operations of 1010 may be performed according to the methods described herein. In some examples, aspects of the operations of 1010 may be performed by a user indication component as described with reference to FIGS. 4 through 7.

At 1015, the UE may signal an indication of a location of at least one antenna of the one or more antennas affected by the signal blockage. The operations of 1015 may be performed according to the methods described herein. In some examples, aspects of the operations of 1015 may be performed by a signal blockage indication component as described with reference to FIGS. 4 through 7.

Figure 11:
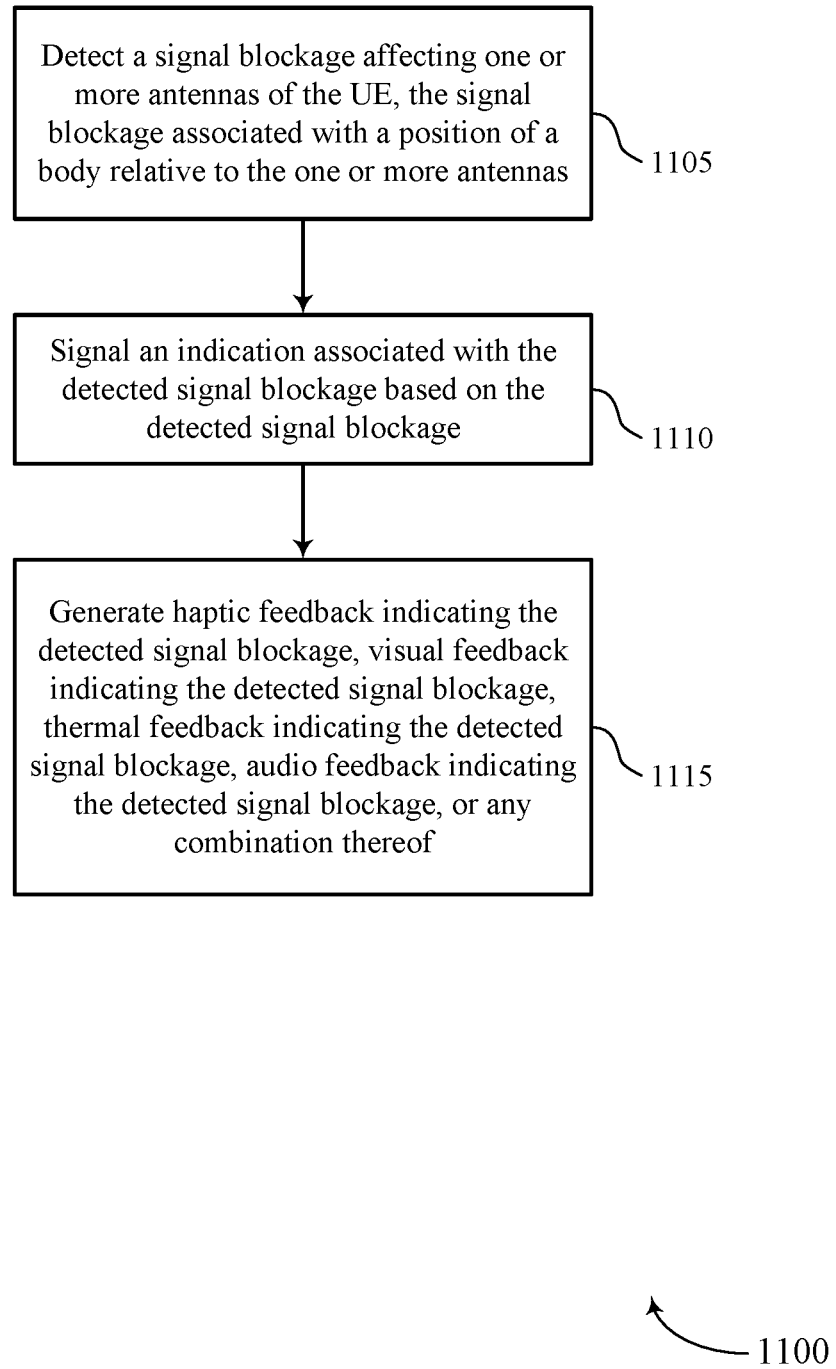

FIG. 11 shows a flowchart illustrating a method 1100 that supports user-involved antenna management in accordance with aspects of the present disclosure. The operations of method 1100 may be implemented by a UE 115 or its components as described herein. For example, the operations of method 1100 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1105, the UE may detect a signal blockage affecting one or more antennas of the UE, the signal blockage associated with a position of a body relative to the one or more antennas. The operations of 1105 may be performed according to the methods described herein. In some examples, aspects of the operations of 1105 may be performed by an MPE sensor as described with reference to FIGS. 4 through 7.

At 1110, the UE may signal an indication associated with the detected signal blockage based on the detected signal blockage. The operations of 1110 may be performed according to the methods described herein. In some examples, aspects of the operations of 1110 may be performed by a user indication component as described with reference to FIGS. 4 through 7.

At 1115, the UE may generate haptic feedback indicating the detected signal blockage, visual feedback indicating the detected signal blockage, thermal feedback indicating the detected signal blockage, audio feedback indicating the detected signal blockage, or any combination thereof. The operations of 1115 may be performed according to the methods described herein. In some examples, aspects of the operations of 1115 may be performed by a feedback component as described with reference to FIGS. 4 through 7.

Figure 12:
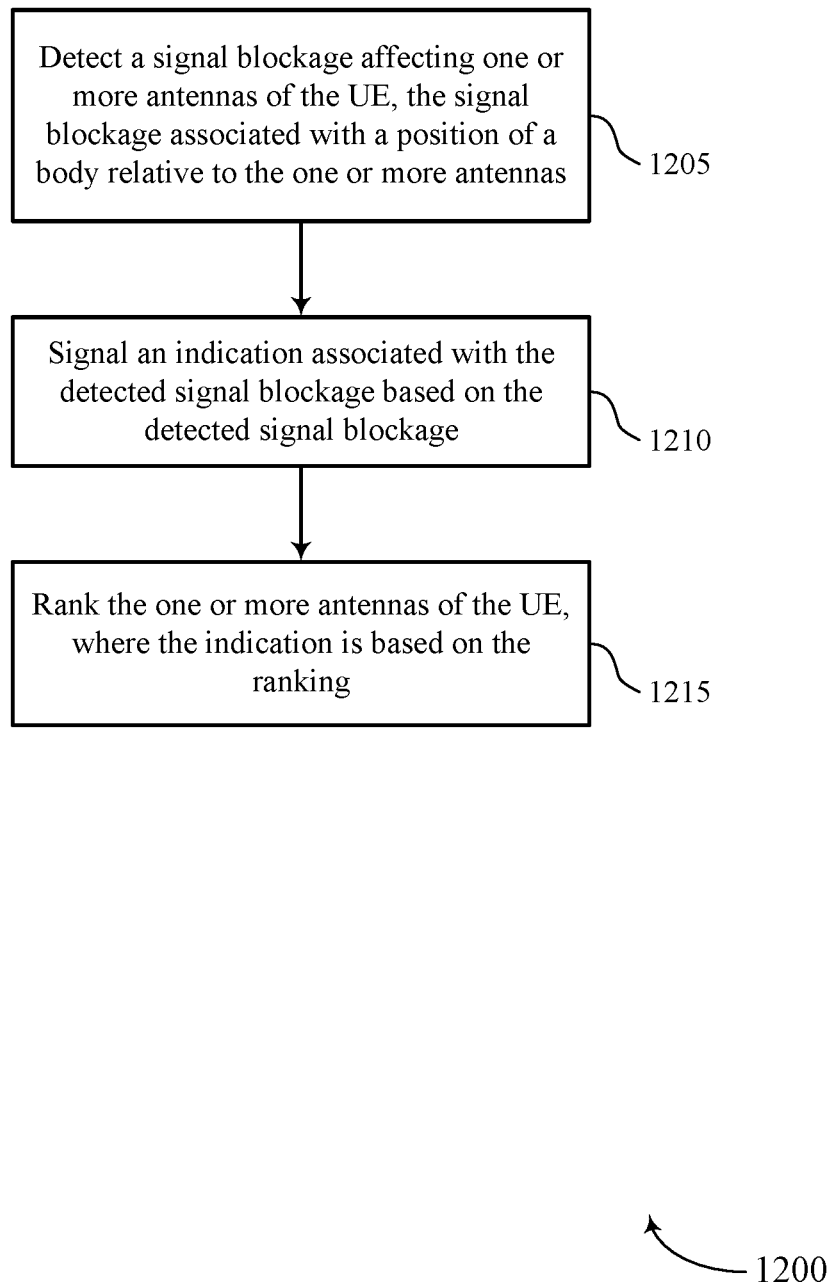

FIG. 12 shows a flowchart illustrating a method 1200 that supports user-involved antenna management in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may detect a signal blockage affecting one or more antennas of the UE, the signal blockage associated with a position of a body relative to the one or more antennas. The operations of 1205 may be performed according to the methods described herein. In some examples, aspects of the operations of 1205 may be performed by an MPE sensor as described with reference to FIGS. 4 through 7.

At 1210, the UE may signal an indication associated with the detected signal blockage based on the detected signal blockage. The operations of 1210 may be performed according to the methods described herein. In some examples, aspects of the operations of 1210 may be performed by a user indication component as described with reference to FIGS. 4 through 7.

At 1215, the UE may rank the one or more antennas of the UE, where the indication is based on the ranking. The operations of 1215 may be performed according to the methods described herein. In some examples, aspects of the operations of 1215 may be performed by an antenna ranking component as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein.

Example 1: A method of wireless communication comprising detecting a signal blockage affecting one or more antennas of the UE, the signal blockage associated with a position of a body relative to the one or more antennas, and signaling an indication associated with the detected signal blockage based at least in part on the detected signal blockage.

Example 2: The method of example 1, wherein signaling the indication comprises: signaling an indication of a location of at least one antenna of the one or more antennas affected by the signal blockage.

Example 3: The method of any of examples 1 or 2, wherein signaling the indication comprises: signaling, to a user, the indication via an interface of the UE, and generating haptic feedback indicating the detected signal blockage, visual feedback indicating the detected signal blockage, thermal feedback indicating the detected signal blockage, audio feedback indicating the detected signal blockage, or any combination thereof.

Example 4: The method of example 3, wherein the visual feedback comprises an on-screen indication, an indication on a structure of the UE, an indication on an edge of the UE, an indication via visible light, an indication via invisible light, or a combination thereof.

Example 5: The method of any of examples 1 to 4, further comprising: ranking the one or more antennas of the UE, wherein the indication associated with the detected signal blockage is based at least in part on the ranking.

Example 6: The method of any of examples 1 to 5, further comprising: identifying a usage amount for each antenna of the one or more antennas, wherein signaling the indication associated with the detected signal blockage is based at least in part on the determined usage amount for each antenna and a signal blockage at each antenna.

Example 7: The method of example 6, wherein identifying the usage amount for each antenna of the one or more antennas comprises: calculating a respective percentage of time that each antenna of the one or more antennas is used, wherein signaling the indication associated with the detected signal blockage is based at least in part on a percentage of time for at least one antenna of the one or more antennas satisfying a threshold.

Example 8: The method of any of examples 6 or 7, wherein identifying the usage amount for each antenna of the one or more antennas comprises: calculating a respective fraction of time that each antenna of the one or more antennas is used relative to another antenna of the one or more antennas, wherein signaling the indication associated with the detected signal blockage is based at least in part on the respective fraction of time for at least one antenna of the one or more antennas satisfying a threshold.

Example 9: The method of any of examples 6 to 8, wherein the usage amount is based at least in part on uplink communications, downlink communications, or a combination thereof.

Example 10: The method of any of examples 1 to 9, wherein signaling the indication associated with the detected signal blockage is based at least in part on determined sensor information comprising a location of the UE, an orientation of the UE, or a combination thereof.

Example 11: The method of any of examples 1 to 10, further comprising: identifying a link budget for the one or more antennas, wherein signaling the indication associated with the detected signal blockage is based at least in part on the link budget satisfying a threshold.

Example 12: The method of example 11, wherein the link budget for the one or more antennas is based at least in part on an RSRP, an RSRQ, one or more neighboring cells, an MCS, a power headroom, uplink transmissions, downlink transmissions, or a combination thereof.

Example 13: The method of any of examples 1 to 12, further comprising: determining a frequency of reducing a transmission power for the one or more antennas, wherein signaling the indication associated with the detected signal blockage is based at least in part on the determined frequency satisfying a threshold.

Example 14: The method of example 13, wherein the transmission power is reduced based at least in part on a proximity of tissue to the one or more antennas.

Example 15: The method of any of examples 1 to 14, further comprising: determining a type of communications by the UE, wherein signaling the indication associated with the detected signal blockage is based at least in part on the determined type of communications.

Example 16: The method of example 15, wherein the type of communications comprises high-priority communications, low-latency communications, or a combination thereof.

Example 17: The method of any of examples 1 to 16, wherein signaling the indication associated with the detected signal blockage comprises: adjusting an intensity or frequency of feedback indicating the signal blockage, wherein the intensity of the feedback is based at least in part on a severity of the detected signal blockage.

Example 18: The method of any of examples 1 to 17, further comprising:
determining a type of signal blockage affecting the one or more antennas, wherein the indication associated with the detected signal blockage is based at least in part on the type of signal blockage.

Example 19: The method of any of examples 1 to 18, further comprising: receiving downlink signaling at the one or more antennas of the UE, wherein detecting the signal blockage is based at least in part on the received downlink signaling.

Example 20: The method of any of examples 1 to 19, wherein the detected signal blockage is caused by tissue of the body near the one or more antennas based at least in part on the position of the body.

Example 21: The method of any of examples 1 to 20, wherein the indication associated with the detected signal blockage comprises an indication to change the position of the body.

Example 22: The method of any of examples 1 to 21, wherein each antenna of the one or more antennas is part of one or more antenna arrays configured for millimeter wave communications.

Example 23: An apparatus comprising at least one means for performing a method of any of examples 1 to 22.

Example 24: An apparatus for wireless communications comprising a processor; memory in electronic communication with the processor; and instructions stored in the memory and executable by the processor to cause the apparatus to perform a method of any of examples 1 to 22.

Example 25: A non-transitory computer-readable medium storing code for wireless communications, the code comprising instructions executable by a processor to perform a method of any of examples 1 to 22.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a CSG, UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    detecting a signal blockage affecting one or more antennas of the UE, the signal blockage associated with a position of a body relative to the one or more antennas based at least in part on detecting a presence of tissue near the one or more affected antennas;
    identifying a usage amount for each antenna of the one or more antennas; and
    signaling an indication associated with the detected signal blockage based at least in part on the detected signal blockage and the usage amount for each antenna of the one or more antennas.

2. The method of claim 1, wherein signaling the indication comprises:
    signaling an indication of a location of at least one antenna of the one or more antennas affected by the signal blockage.

3. The method of claim 1, wherein signaling the indication comprises:
    signaling, to a user, the indication via an interface of the UE; and
    generating haptic feedback indicating the detected signal blockage, visual feedback indicating the detected signal blockage, thermal feedback indicating the detected signal blockage, audio feedback indicating the detected signal blockage, or any combination thereof.

4. The method of claim 3, wherein the visual feedback comprises an on-screen indication, an indication on a structure of the UE, an indication on an edge of the UE, an indication via visible light, an indication via invisible light, or a combination thereof.

5. The method of claim 1, further comprising:
    ranking the one or more antennas of the UE, wherein the indication associated with the detected signal blockage is based at least in part on the ranking.

6. The method of claim 1, wherein identifying the usage amount for each antenna of the one or more antennas comprises:
    calculating a respective percentage of time that each antenna of the one or more antennas is used, wherein signaling the indication associated with the detected signal blockage is based at least in part on a percentage of time for at least one antenna of the one or more antennas satisfying a threshold.

7. The method of claim 1, wherein identifying the usage amount for each antenna of the one or more antennas comprises:
    calculating a respective fraction of time that each antenna of the one or more antennas is used relative to another antenna of the one or more antennas, wherein signaling the indication associated with the detected signal blockage is based at least in part on the respective fraction of time for at least one antenna of the one or more antennas satisfying a threshold.

8. The method of claim 1, wherein the usage amount is based at least in part on uplink communications, downlink communications, or a combination thereof.

9. The method of claim 1, wherein signaling the indication associated with the detected signal blockage is based at least in part on determined sensor information comprising a location of the UE, an orientation of the UE, or a combination thereof.

10. The method of claim 1, further comprising:
    identifying a link budget for the one or more antennas, wherein signaling the indication associated with the detected signal blockage is based at least in part on the link budget satisfying a threshold.

11. The method of claim 10, wherein the link budget for the one or more antennas is based at least in part on a reference signal received power (RSRP), a reference signal received quality (RSRQ), one or more neighboring cells, a modulation and coding scheme, a power headroom, uplink transmissions, downlink transmissions, or a combination thereof.

12. The method of claim 1, further comprising:
    determining a frequency of reducing a transmission power for the one or more antennas, wherein signaling the indication associated with the detected signal blockage is based at least in part on the determined frequency satisfying a threshold.

13. The method of claim 12, wherein the transmission power is reduced based at least in part on a proximity of the tissue to the one or more antennas.

14. The method of claim 1, further comprising:
determining a type of communications by the UE, wherein signaling the indication associated with the detected signal blockage is based at least in part on the determined type of communications.

15. The method of claim 14, wherein the type of communications comprises high-priority communications, low-latency communications, or a combination thereof.

16. The method of claim 1, wherein signaling the indication associated with the detected signal blockage comprises:
generating feedback indicating the detected signal blockage, wherein an intensity or a frequency of the feedback is based at least in part on a severity of the detected signal blockage.

17. The method of claim 1, further comprising:
determining a type of signal blockage affecting the one or more antennas, wherein the indication associated with the detected signal blockage is based at least in part on the type of signal blockage.

18. The method of claim 1, further comprising:
receiving downlink signaling at the one or more antennas of the UE, wherein detecting the signal blockage is based at least in part on the received downlink signaling.

19. The method of claim 1, wherein the detected signal blockage is caused by the tissue of the body near the one or more antennas based at least in part on the position of the body.

20. The method of claim 1, wherein the indication associated with the detected signal blockage comprises an indication to change the position of the body.

21. The method of claim 1, wherein each antenna of the one or more antennas is part of one or more antenna arrays configured for millimeter wave communications.

22. An apparatus for wireless communication at a user equipment (UE), comprising:
a processor;
a memory coupled with the processor; and
instructions stored in the memory and executable by the processor to cause the apparatus to:
detect a signal blockage affecting one or more antennas of the UE, the signal blockage associated with a position of a body relative to the one or more antennas based at least in part on detecting a presence of tissue near the one or more affected antennas;
identify a usage amount for each antenna of the one or more antennas; and
signal an indication associated with the detected signal blockage based at least in part on the detected signal blockage and the usage amount for each antenna of the one or more antennas.

23. The apparatus of claim 22, wherein the instructions to signal the indication are executable by the processor to cause the apparatus to:
signal an indication of a location of at least one antenna of the one or more antennas affected by the signal blockage.

24. The apparatus of claim 22, wherein the instructions to signal the indication are executable by the processor to cause the apparatus to:
signal, to a user, the indication via an interface of the UE; and
generate haptic feedback indicating the detected signal blockage, visual feedback indicating the detected signal blockage, thermal feedback indicating the detected signal blockage, audio feedback indicating the detected signal blockage, or any combination thereof.

25. The apparatus of claim 22, wherein the instructions are further executable by the processor to cause the apparatus to:
rank the one or more antennas of the UE, wherein the indication associated with the detected signal blockage is based at least in part on the ranking.

26. The apparatus of claim 22, wherein the instructions to identify the usage amount for each antenna of the one or more antennas are executable by the processor to cause the apparatus to:
calculate a respective percentage of time that each antenna of the one or more antennas is used, wherein signaling the indication associated with the detected signal blockage is based at least in part on a percentage of time for at least one antenna of the one or more antennas satisfying a threshold.

27. An apparatus for wireless communication at a user equipment (UE), comprising:
means for detecting a signal blockage affecting one or more antennas of the UE, the signal blockage associated with a position of a body relative to the one or more antennas based at least in part on detecting a presence of tissue near the one or more affected antennas;
means for identifying a usage amount for each antenna of the one or more antennas; and
means for signaling an indication associated with the detected signal blockage based at least in part on the detected signal blockage and the usage amount for each antenna of the one or more antennas.

28. A non-transitory computer-readable medium storing code for wireless communication at a user equipment (UE), the code comprising instructions executable by a processor to:
detect a signal blockage affecting one or more antennas of the UE, the signal blockage associated with a position of a body relative to the one or more antennas based at least in part on detecting a presence of tissue near the one or more affected antennas;
identify a usage amount for each antenna of the one or more antennas; and
signal an indication associated with the detected signal blockage based at least in part on the detected signal blockage and the usage amount for each antenna of the one or more antennas.

29. The method of claim 1, further comprising:
detecting, via a sensor of the UE, the presence of the tissue near the one or more affected antennas of a set of antennas of the UE.

30. The method of claim 29, further comprising:
determining that the tissue is within a threshold proximity of the one or more affected antennas, wherein detecting the signal blockage is based at least in part on the tissue being within the threshold proximity of the one or more affected antennas.

31. The method of claim 29, wherein the sensor is a near-field maximum permissible exposure (MPE) sensor.

32. The apparatus of claim 22, further comprising:
a sensor, wherein the instructions are further executable by the processor to cause the apparatus to:
detect, via the sensor, the presence of the tissue near the one or more affected antennas of the UE.

33. The apparatus of claim 32, wherein the instructions are further executable by the processor to cause the apparatus to:

determine that the tissue is within a threshold proximity of the one or more affected antennas, wherein the determination of the signal blockage is based at least in part on the tissue being within the threshold proximity of the one or more affected antennas.

34. The apparatus of claim 32, wherein the sensor is a near-field maximum permissible exposure (MPE) sensor.

35. The apparatus of claim 27, further comprising:

means for detecting, via a sensor of the UE, the presence of the tissue near the one or more affected antennas of a set of antennas of the UE.

36. The apparatus of claim 35, further comprising:

means for determining that the tissue is within a threshold proximity of the one or more affected antennas, wherein detecting the signal blockage is based at least in part on the tissue being within the threshold proximity of the one or more affected antennas.

37. The apparatus of claim 35, wherein the sensor is a near-field maximum permissible exposure (MPE) sensor.

38. The non-transitory computer-readable medium of claim 28, wherein the instructions are further executable by the processor to:

detect, via a sensor of the UE, the presence of the tissue near the one or more affected antennas of a set of antennas of the UE.

39. The non-transitory computer-readable medium of claim 38, wherein the instructions are further executable by the processor to:

determine that the tissue is within a threshold proximity of the one or more affected antennas, wherein detecting the signal blockage is based at least in part on the tissue being within the threshold proximity of the one or more affected antennas.

40. The non-transitory computer-readable medium of claim 38, wherein the sensor is a near-field maximum permissible exposure (MPE) sensor.

* * * * *